United States Patent [19]
Furuya et al.

[11] Patent Number: 4,616,846
[45] Date of Patent: Oct. 14, 1986

[54] CONTROL DEVICE FOR A SUSPENSION

[75] Inventors: Kunitaka Furuya; Hiromi Inagaki; Kiyoshi Koga; Masaru Yorita; Tsunehiko Fukatsu; Kazuo Matsuura, all of Tochigi, Japan

[73] Assignee: Honda Giken Kogyo Kabushiki Kaisha, Tokyo, Japan

[21] Appl. No.: 765,341

[22] Filed: Aug. 13, 1985

[30] Foreign Application Priority Data

Aug. 14, 1984 [JP] Japan .................. 59-169839
Aug. 14, 1984 [JP] Japan .................. 59-169840
Aug. 14, 1984 [JP] Japan .................. 59-169841
Aug. 14, 1984 [JP] Japan .................. 59-169842

[51] Int. Cl.$^4$ ............... B60G 17/04; B60G 15/00
[52] U.S. Cl. ............... 280/673; 280/707; 267/57.1 R; 267/140.1
[58] Field of Search ............ 280/707, 673, DIG. 1, 280/674; 267/11 A, 64.25, 64.16, 57.1 R, 64.11, 140.1; 248/631, 636

[56] References Cited

U.S. PATENT DOCUMENTS

| 3,195,878 | 7/1965 | Rosky | 280/673 |
| 3,328,019 | 6/1967 | Wilson | 267/64.16 |
| 3,642,268 | 2/1972 | Hipsher | 267/57.1 R |
| 3,884,496 | 5/1975 | Ito | 267/64.16 |
| 4,377,216 | 3/1983 | Ueno | 267/140.1 |

Primary Examiner—John J. Love
Assistant Examiner—Karin L. Ferriter
Attorney, Agent, or Firm—Irving M. Weiner; Joseph P. Carrier; Pamela S. Burt

[57] ABSTRACT

A control device in a suspension having a link rod includes a pair of fluid-sealed bushings provided on the respective opposite ends of the link rod and having hydraulically adjustable compliances, a valve mechanism for varying the compliances of the fluid-sealed bushings, an actuator for actuating the valve mechanism, and a control mechanism for controlling the actuator. The control mechanism includes a first sensor for detecting the acceleration of vertical vibrations of the vehicle body and generating a signal commensurate with the detected acceleration, a bandpass filter connected to the first sensor for transmitting a signal having a frequency range in the vicinity of the natural frequency of the sprung mass of the vehicle, a second sensor for detecting the steering angle of the steering wheel and generating a signal commensurate with the detected steering angle, a third sensor for detecting when the vehicle is braked and generating a signal when the vehicle is braking, and a circuit for processing the signals from the bandpass filter, the second sensor, and the third sensor to control the actuator based on the processed signals. The control device can control the compliances of the bushings dependent on the road conditions and the conditions in which the vehicle is operated.

16 Claims, 7 Drawing Figures

CONTROL DEVICE FOR A SUSPENSION

BACKGROUND OF THE INVENTION

1. Field of the Invention

The present invention relates to a suspension for use in vehicles, and more particularly to a control device for such a suspension.

2. Description of the Relevant Art

In most cases, one of the link rods in a vehicle suspension and another element are connected to each other by a rubber bushing. The value of the best compliance of the rubber bushing depends largely on the conditions of the road on which the vehicle runs and also on the conditions in which the vehicle is operated. Therefore, conventional bushings having fixed compliances have only met some of the various conditions.

SUMMARY OF THE INVENTION

It is an object of the present invention to provide a vehicle suspension having an adjustable-compliance bushing so as to be capable of meeting more road and vehicle operation conditions.

Another object of the present invention is to provide a control device for such a vehicle suspension having an adjustable-compliance bushing, the control device being capable of controlling the compliance of the bushing.

According to the present invention, a control device in a vehicle suspension having a link rod includes a pair of fluid-sealed bushings provided on the respective opposite ends of the link rod and having hydraulically adjustable compliances, a valve means for varying the compliances of the bushings, an actuator for actuating the valve means, and a control means for controlling the actuator.

The control means is composed of a first sensor for detecting the acceleration of vertical vibrations of the vehicle body and generating a signal commensurate with the detected acceleration, a bandpass filter connected to the first sensor for transmitting a signal having a frequency range in the vicinity of the natural frequency of the sprung mass of the vehicle, a second sensor for detecting the steering angle of the steering wheel and generating a signal commensurate with the detected steering angle, a third sensor for detecting when the vehicle is braked and generating a signal when the vehicle is braking, and a circuit means for processing the signals from the bandpass filter, the second sensor, and the third sensor to control the actuator based on the processed signals.

The above and further objects, details and advantages of the present invention will become apparent from the following detailed description of preferred embodiments, when read in conjunction with the accompanying drawings.

DETAILED DESCRIPTION OF THE PREFERRED EMBODIMENTS

A control device according to a preferred embodiment of the present invention includes a pair of fluid-sealed bushings provided on the respective opposite ends of a radius rod in a vehicle suspension, a control valve associated with the bushings, an actuator for actuating the control valve, and a control means having sensors for controlling the actuator.

Figure 1:
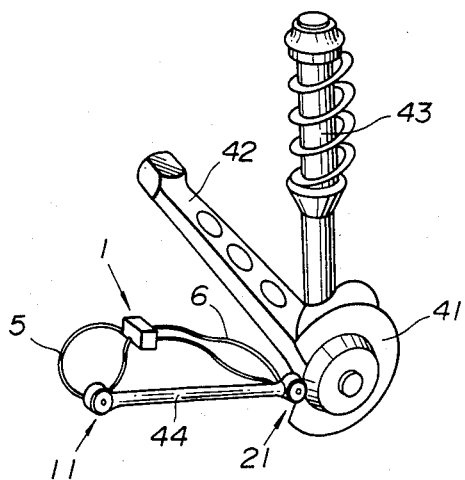
FIG. 1 is a perspective view of a vehicle suspension in which a control device of the present invention is incorporated.

FIG. 1 shows a vehicle suspension in which the control device of the invention is incorporated. The vehicle suspension includes a hub 41, a lower arm 42, a damper 43, and a radius rod 44 extending longitudinally of a vehicle body. A pair of fluid-sealed bushings 11, 21 are mounted on the respective opposite ends of the radius rod 44.

Figure 2:
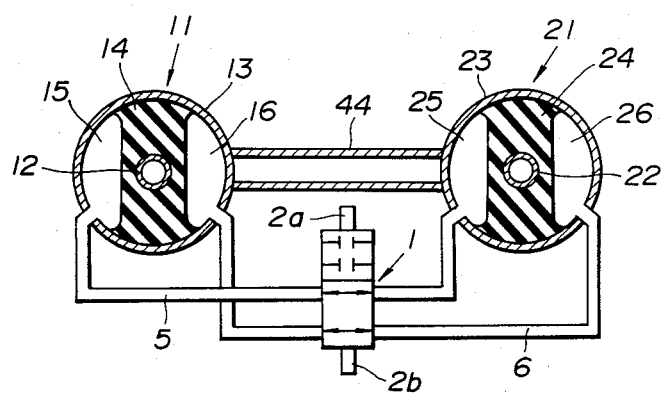
FIGS. 2 through 4 are schematic cross-sectional views of an assembly of a radius rod in the vehicle suspension of FIG. 1, fluid-sealed bushings provided on the respective opposite ends of the radius rod, communication passages associated with the bushings, and a control valve means including a control valve.
Figure 3:
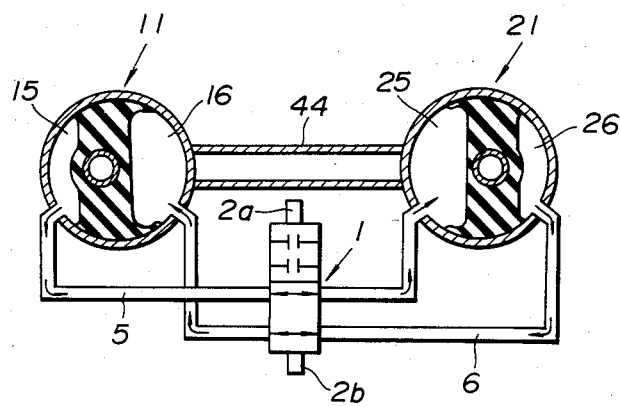
Figure 4:
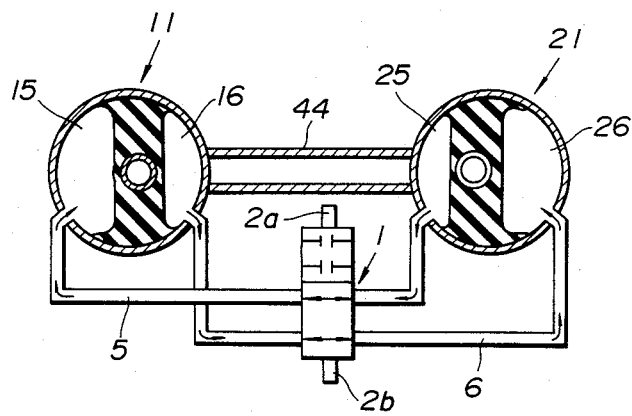

FIGS. 2 through 4 illustrate the internal structures of the fluid-sealed bushings 11, 21 which are shown schematically for a fuller understanding of operation of the control device. Each of the fluid-sealed bushings 11, 21 includes an inner tube 12, 22 through which a support pin extends, an outer tube 13, 23 fixed to the ends of the radius rod 44, and a thick diametrical rubber wall 14, 24 joining the inner and outer tubes together. The axial ends of the fluid-sealed bushing 11, 21 are closed by rubber walls integral with the rubber wall 14, 24. The fluid-sealed bushing 11, 21 have therein a front fluid camber 15, 25 and a rear fluid chamber 16, 26 which are defined in a diametrically opposite fashion by the rubber wall 14, 24 between the inner tube 12, 22 and the outer tube 13, 23 and which are positioned in front and rear positions, respectively, in the longitudinal direction of the vehicle body. The front and rear chambers are filled with a fluid. The support pin inserted through the inner tube 12 in the fluid-sealed bushing 11 on the front end of the radius rod 44 is supported on the vehicle body, and the support pin inserted through the inner tube 22 in the fluid-sealed bushing 21 on the rear end of the radius rod 44 is supported on a knuckle.

The front fluid chambers 15, 25 in the fluid-sealed bushings 11, 21 are connected by a first fluid passage 5, and the rear fluid chambers 16, 26 therein are connected by a second fluid passage 6, the first and second fluid passages 5, 6 being coupled to a control valve 1 for simultaneously opening and closing the first and second fluid passages 5, 6. The control valve 1 is actuated by an actuator 2 (FIG. 5) composed of solenoids 2a, 2b. When one of the solenoids 2a is energized, the fluid passages 5, 6 are open as shown in FIGS. 2 through 4, and when the other solenoid 2b is energized, the fluid passages 5, 6 are closed. In FIG. 2, the radius rod 44 is shown as being in a free state free from any external forces.

FIG. 3 shows the radius rod 44 subjected to external tensile forces. With the control valve 1 open as illustrated, the fluid flows from the front fluid chamber 15 in the front bushing 11 as the front fluid chamber 15 is contracted under the external forces applied, through the first passage 5 into the front fluid chamber 25 in the rear bushing 21 as the front fluid chamber 25 expands under the external forces applied. At the same time, the fluid flows from the rear fluid chamber 26 in the rear bushing 21 through the second passage 6 into the rear fluid chamber 16 in the front bushing 11. Therefore, when the control valve 1 is open, the compliances of the bushings 11, 21 in the longitudinal direction of the vehicle body are large. When the passages 5, 6 are closed by energizing the solenoid 2b, the fluid flow through the passages 5, 6 is cut off, and the compliances of the bushings 11, 21 in the longitudinal direction of the vehicle body are reduced.

FIG. 4 illustrates the condition in which the radius rod 44 is under compressive forces and the fluid flows through the passages 5, 6 in the directions opposite to those in FIG. 3.

The control valve may have a plurality of sets of passageways having different cross-sectional areas and may be mechanically actuated through multiple steps for changing the compliances of the rubber bushings through three or more stages. Alternatively, each fluid-sealed bushing may have three or more fluid chambers.

Figure 5:
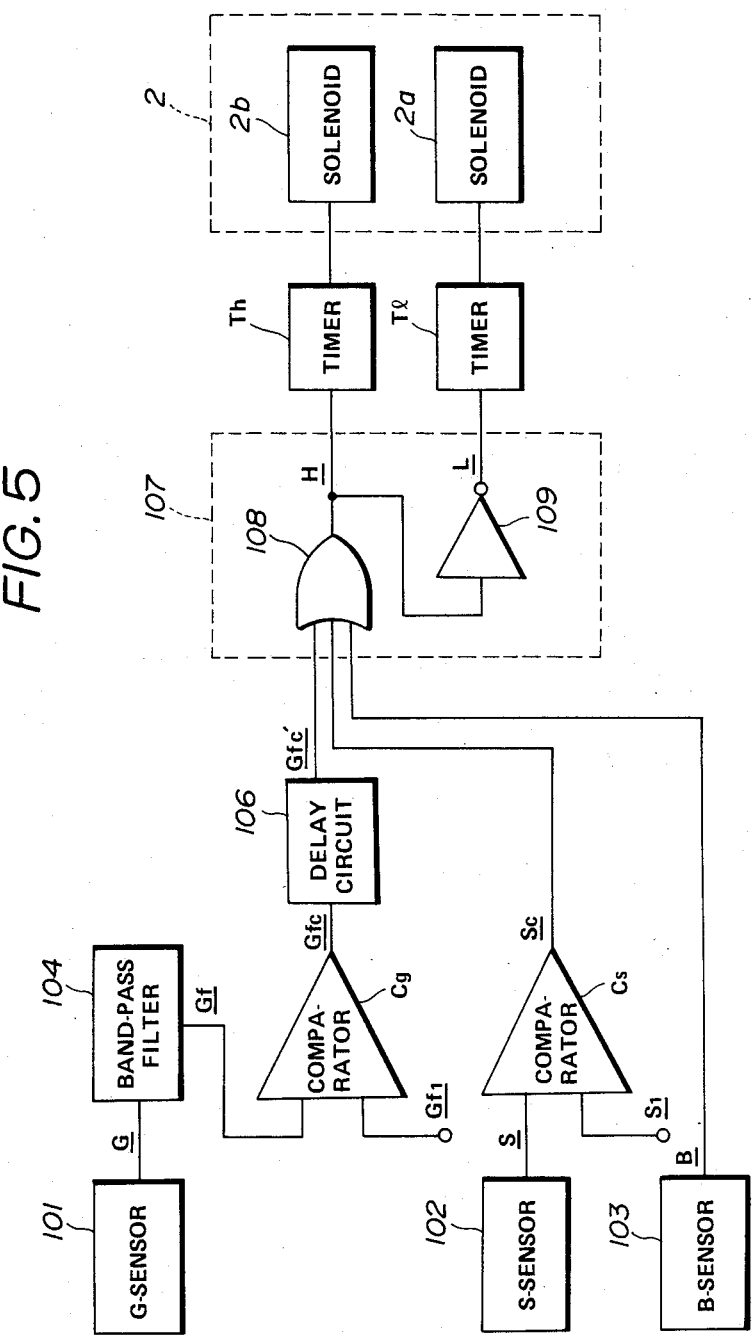
FIGS. 5 through 7 are block diagrams of first through third arrangements, respectively, of a control means for controlling an actuator in the control device of the present invention.
Figure 6:
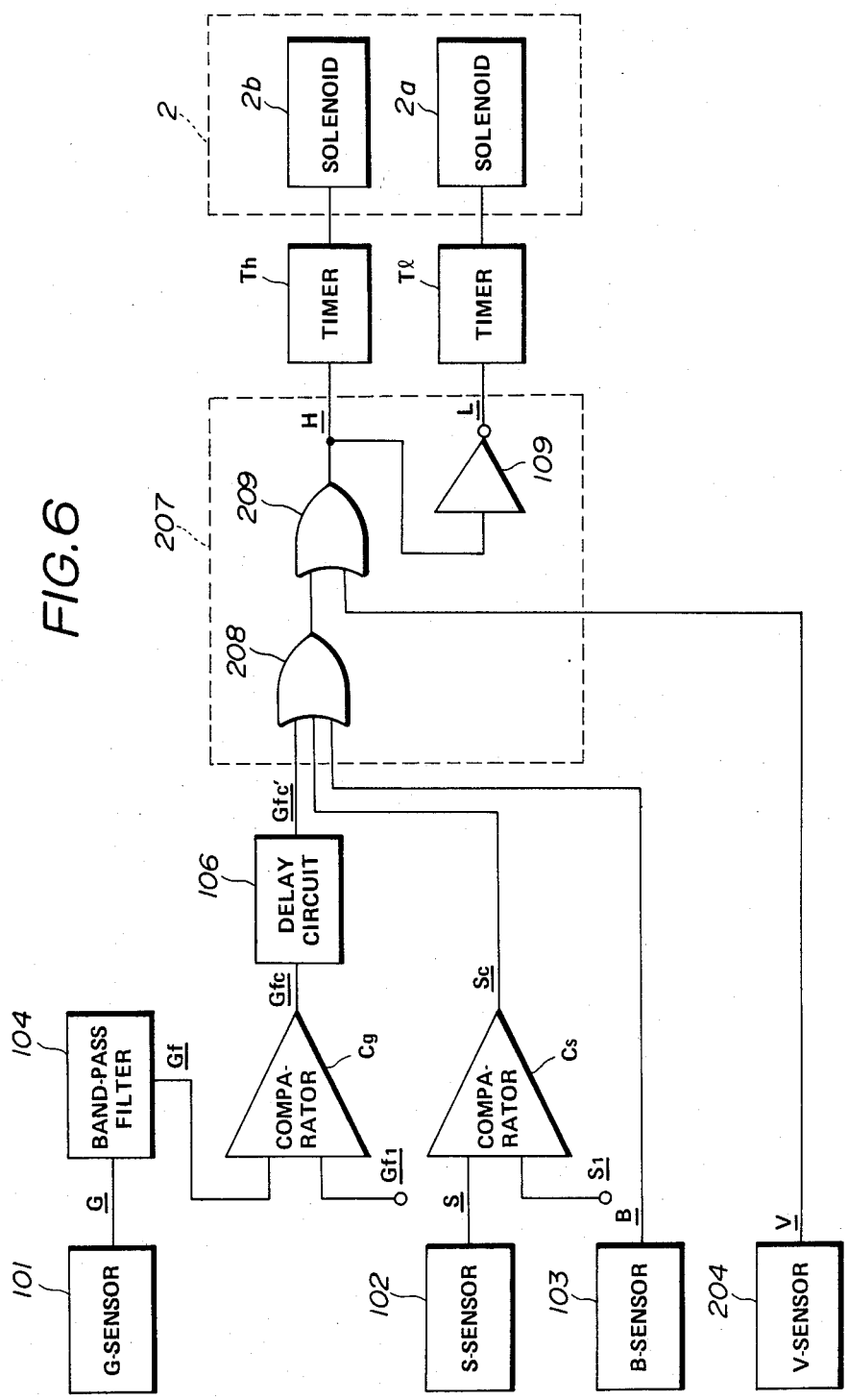
Figure 7:
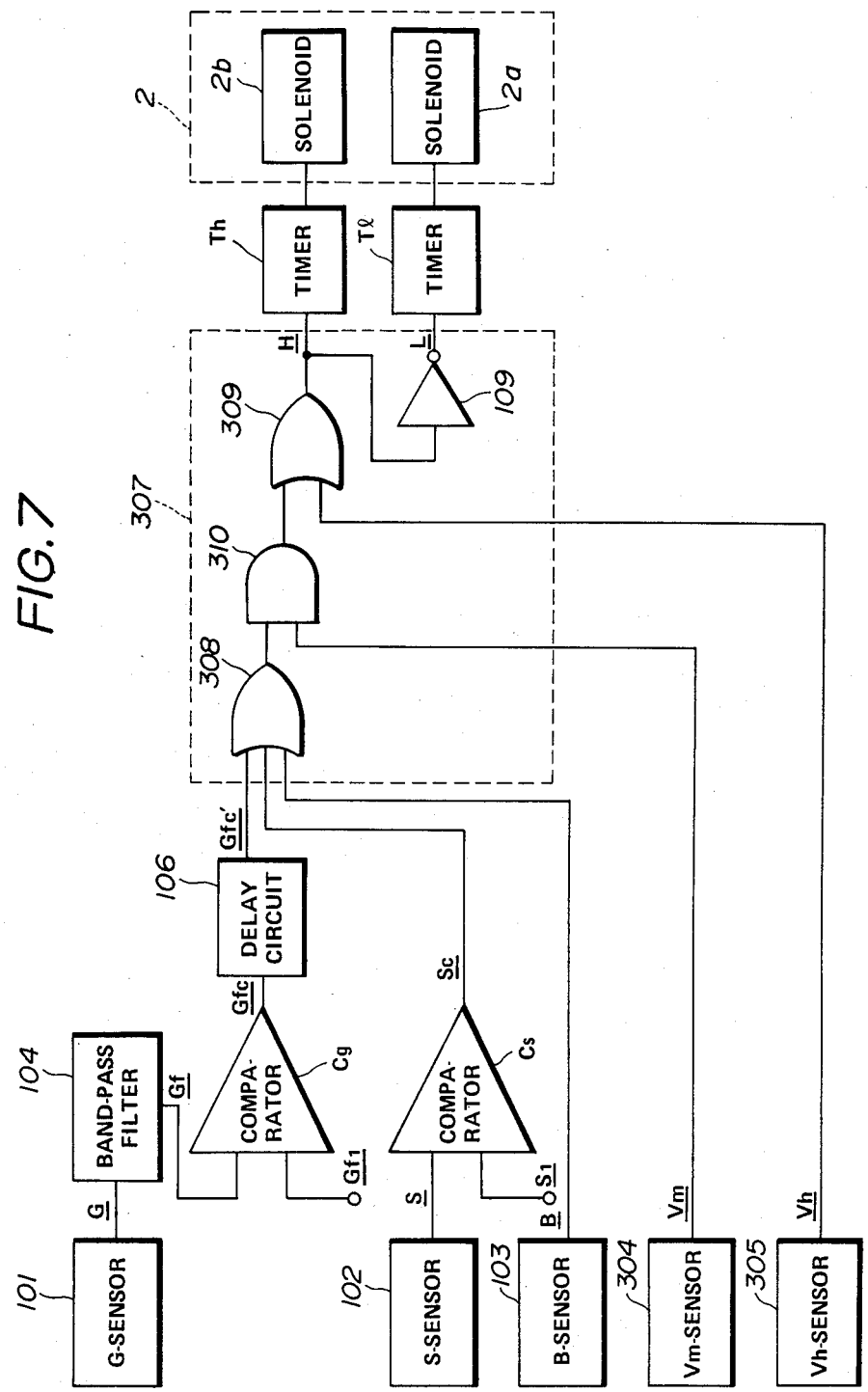

A control means for controlling the actuator 2 for the control valve 1 will be described. FIGS. 5 through 7 illustrate three different circuit arrangements of the control means which can be combined with the bushing assembly as shown in FIGS. 1 through 4 for energizing the solenoids 2a, 2b of the actuator 2.

As shown in FIG. 5, the control means according to the first arrangement includes a first sensor (hereinafter referred to as a "G sensor") 101 for detecting the acceleration of vertical vibrations of the vehicle body affected by the road conditions and varying vehicle speeds and generating a signal G commensurate with the detected acceleration, a second sensor (hereinafter referred to as an "S sensor") 102 for detecting the steering angle of the steering wheel and generating a signal S dependent on the detected steering angle, and a third sensor (hereinafter referred to as a "B sensor") 103 for detecting the ON-OFF condition of a brake switch and generating a signal B dependent on the detected ON-OFF condition. The output signal G from the G sensor 101 is applied to a bandpass filter 104 connected to the G sensor 101. The bandpass filter 104 transmits those components of the signal G which are in a frequency range in the vicinity of the natural frequency of the sprung mass of the vehicle on which the suspension is installed, i.e., in a frequency band in which the substantial resonance of the sprung mass of the vehicle can be induced. An output signal Gf from the bandpass filter 104 is applied to a comparator Cg connected thereto. The comparator Cg compares the output signal Gf with a fixed value Gf1 and generates an output voltage signal Gfc which is "1" or high in level when the output signal Gf is larger than the reference value Gf1 and which is "0" or low in level when the output signal Gf is smaller than the reference value Gf1. In particular, the output signal Gfc which is "1" will be called a detected signal. The signal Gfc is then fed to a delay circuit 106 which issues and output signal Gfc' delayed a certain time with respect to the applied input signal. The delayed signal Gfc' is supplied to an OR gate 108 in a logic circuit 107. The delay circuit 106 serves to keep the bushing compliances large while the vehicle is running on a road having an irregular pavement seam, so that no detected signal will be applied to the OR gate 108 until the vehicle goes over the irregular pavement seam. The delay circuit 106 therefore assures good riding comfort when the vehicle travels on irregularly paved roads.

The output signal S from the S sensor 102 is applied to a comparator Cs connected thereto. The comparator Cs compares the output signal S with a fixed reference signal S1 and issues a signal Sc which is "1" or high when the output signal S is higher than the reference signal S1 and which is "0" or low when the output signal S is lower than the reference signal S1. In particular, the output signal Sc which is "1" is called a detected signal. The output signal B from the B sensor 103 is "1" or high when the brake switch is turned on and "0" or low when the brake switch is turned off. In particular, the output signal B which is "1" is called a detected signal. The signals Sc, B from the comparator Cs and the B sensor 103 are applied to the OR gate 108.

When at least one of the three input signals applied to the OR gate 108 is "1", an output signal of "1" is issued from the output terminal of the OR gate 108. When all of the three input signals are "0", then an output signal of "0" is issued from the output terminal of the OR gate 108. When the output signal, denoted at H, from the OR gate 108 is changed from "0" to "1", it energizes the solenoid 2b through a timer switch Th for closing the fluid passages 5, 6 to reduce the compliances of the fluid-sealed bushings 11, 21 in the longitudinal direction of the vehicle. The timer switch Th is employed to stop the energization of the solenoid 2b after the control valve 1 has been shifted by the actuator 2.

The output signal H from the OR gate 108 is also applied to a NOT gate or inverter 109 which produces an inverted output signal L from its output terminal. When the output signal L is changed from "0" to "1", the solenoid 2a is energized thereby through a timer switch Tl connected to the output terminal of the NOT gate 109 for opening the fluid passages 5, 6 to increase the compliances of the fluid-sealed bushings 11, 21.

When the signal Gf having frequency components of the vehicle body acceleration signal G which are in the vicinity of the natural frequency of the sprung mass of the vehicle body is higher than the prescribed reference signal Gf1, or when the steering angle signal S is higher than the prescribed reference signal S1, or when the brake signal B is "1", the output signal H from the OR gate 108 is "1" and the output signal L from the NOT gate 109 is "0". Stated otherwise, when the vehicle runs on a relatively rough road having large surface irregularities, or when the vehicle turns around a corner, or when the vehicle is braked, the compliances of the bushings 11, 21 in the longitudinal direction of the vehicle are relatively large. When the vehicle runs along a straight line on a relatively smooth road free from surface irregularities and is not braked, the compliances of the bushings 11, 21 in the longitudinal direction of the vehicle are relatively small for better riding comfort.

FIG. 6 shows a second arrangement of the control means. The second arrangement includes a G sensor, a bandpass filter, a comparator connected to the bandpass filter, a delay circuit, an S sensor, a comparator connected to the S sensor, a B sensor, timer switches connected to the solenoids 2a, 2b of the actuator 2, and a NOT gate coupled to one of the timer switches, all of which are identical to those shown in FIG. 5 and denoted by reference characters identical to those used in FIG. 5. These identical components will not be described in detail. The output signal Gfc' from the delay circuit 106, the output signal Sc from the comparator Cs connected to the S sensor 102, and the output signal B from the B sensor 103 are applied to a first OR gate 208 in a logic circuit 207. The second arrangement additionally includes a sensor (hereinafter referred to as a "V sensor") 204 for detecting the speed of travel of the vehicle to produce an output signal V commensurate with the detected vehicle speed. When the vehicle speed is higher than a prescribed value Vo, the output signal V from the V sensor 204 is "1" or high in level, and when the vehicle speed is lower than the value Vo, the output signal V from the V sensor 204 is "0" or low in level. The output signal V and the output signal from the first OR gate 208 are applied to a second OR gate 209 in the logic circuit 207.

When at least one of the two input signals applied to the second OR gate 209 is "1", an output signal of "1" is issued from the second OR gate 209, and when both are "0", an output signal of "0" is issued from the second OR gate 209. The output signal, denoted at H, from the second OR gate 209 is then fed to the timer switch Th and the NOT gate or inverter 109 connected to the timer switch Tl.

In the suspension control device according to the second arrangement, when the signal Gf having frequency components of the vehicle body acceleration signal G which are in the vicinity of the natural frequency of the sprung mass of the vehicle body is higher than the prescribed reference signal Gf1, or when the steering angle signal S is higher than the prescribed reference signal S1, or when the brake signal B is "1", or when the vehicle speed is higher than the prescribed value Vo, the output signal H from the second OR gate 209 is "1" and the output signal L from the NOT gate 109 is "0". Stated otherwise, when the vehicle runs on a relatively rough road having large surface irregularities, or when the vehicle turns around a corner, or when the vehicle is braked, or when the vehicle is running at a high speed, the compliances of the bushings 11, 21 in the longitudinal direction of the vehicle are relatively large. When the vehicle runs at a relatively low speed along a straight line on a relatively smooth road free from surface irregularities and is not braked, the compliances of the bushings 11, 21 in the longitudinal direction of the vehicle are small for better riding comfort.

FIG. 7 illustrates a third arrangement of the control means. The third arrangement includes a G sensor, a bandpass filter, a comparator connected to the bandpass filter, a delay circuit, an S sensor, a comparator connected to the S sensor, a B sensor, timer switches connected to the solenoids 2a, 2b of the actuator 2, and a NOT gate coupled to one of the timer switches, all of which are identical to those shown in FIG. 5 and denoted by reference characters identical to those used in FIG. 5. These identical components will not be described in detail. The output signal Gfc' from the delay circuit 106, the output signal Sc from the comparator Cs connected to the S sensor 102, and the output signal B from the B sensor 103 are applied to a first OR gate 308 in a logic circuit 307. The third arrangement additionally includes a first vehicle speed sensor (hereinafter referred to as a "Vm sensor") 304 for detecting the speed of travel of the vehicle and a second vehicle speed sensor (hereinafter referred to as a "Vh sensor") 305. When the vehicle speed is higher than a first prescribed value V1, the output signal Vm from the Vm sensor 304 is "1" or high in level, and when the vehicle speed is lower than the first value V1, the output signal Vm from the Vm sensor 304 is "0" or low in level. The output signal Vm and the output signal from the first OR gate 308 are applied to an AND gate 310 in the logic circuit 307. When the vehicle speed is higher than a second prescribed value V2, the output signal Vh from the Vh sensor 305 is "1" or high in level, and when the vehicle speed is lower than the second value V2, the output signal Vh from the Vh sensor 305 is "0" or low in level. The output signal Vh and the output signal from the AND gate 310 are applied to a second OR gate 309 in the logic circuit 307.

The first value V1 corresponds to a speed intermediate between low and medium speeds of travel of the vehicle, and the second value V2 corresponds to a speed intermediate between medium and high speeds of travel of the vehicle. Therefore, the vehicle speed as it is lower than V1 is defined as a low speed, the vehicle speed as it is higher than V1 and lower than V2 is defined as a medium speed, and the vehicle speed as it is higher than V2 is defined as a high speed.

When at least one of the two input signals applied to the second OR gate 309 is "1", an output signal of "1" is issued from the second OR gate 309, and when all of the two input signals applied to the second OR gate 309 are "0", an output signal of "0" is issued from the second OR gate 309. The output signal, denoted at H, from the second OR gate 309 is then fed to the timer switch Th and the NOT gate or inverter 109 connected to the timer switch Tl.

In the suspension control device according to the third arrangement, when the vehicle runs at the medium speed and (a) when the signal Gf having frequency components of the vehicle body acceleration signal G which are in the vicinity of the natural frequency of the sprung mass of the vehicle body is higher than the prescribed reference signal Gf1, or (b) when the steering angle signal S is higher than the prescribed reference signal S1, or (c) when the brake signal B is "1", the compliances of the bushings 11, 21 in the longitudinal directions of the vehicle are relatively larger. When the vehicle runs at the medium speed and when none of the above three conditions (a) through (c) are met, the bushing compliances are relatively small. When the vehicle runs at the low speed, the bushing compliances are relatively small regardless of the above three conditions (a) through (c). When the vehicle travels at the high speed, the bushing compliances are relatively large at all times.

Although there have been described what are at present considered to be the preferred embodiments of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:
1. A control device in a suspension having a link rod in a vehicle including a vehicle body and a steering wheel, comprising:
  a pair of fluid-sealed bushings provided on the respective opposite ends of the link rod and having hydraulically adjustable compliances;
  valve means for varying the compliances of said fluid-sealed bushings;
  an actuator for actuating said valve means; and control means for controlling said actuator.
2. A control device according to claim 1, wherein said control means comprises:
  a first sensor for detecting the acceleration of vertical vibrations of the vehicle body and generating a signal commensurate with the detected acceleration;

a bandpass filter connected to said first sensor for transmitting a signal having a frequency range in the vicinity of the natural frequency of the sprung mass of the vehicle;

a second sensor for detecting the steering angle of the steering wheel and generating a signal commensurate with the detected steering angle;

a third sensor for detecting when the vehicle is braked and generating a signal when the vehicle is braking; and circuit means for processing the signals from said bandpass filter, said second sensor, and said third sensor to control said actuator based on the processed signals.

3. A control device according to claim 2, wherein said circuit means comprises:

a first comparator for issuing a detected signal in response to the output signal from said bandpass filter which is in excess of a prescribed level;

a second comparator for issuing a detected signal in response to the output signal from said second sensor which is in excess of a prescribed level; and a processing circuit connected to said first comparator, said second comparator, and said third sensor for operating said actuator to decrease the compliances of said fluid-sealed bushings when at least one of the output signals from said first comparator, said second comparator, and said third sensor is applied to the processing circuit.

4. A control device according to claim 3, wherein each of said fluid-sealed bushings comprises:

an outer tube connected to said link rod;

an inner tube through which a connecting pin extends; and a rubber member joining said outer and inner tubes to each other and at least partly defining a plurality of fluid chambers, the volumes of which are variable due to relative displacement of said outer and inner tubes.

5. A control device according to claim 4, wherein said fluid chambers include first and second fluid chambers disposed respectively on the opposite sides of said inner tube; and said valve means comprising a first passage connecting the first fluid chamber of one of said fluid-sealed bushings to the first fluid chamber of the other fluid-sealed bushing, a second passage connecting the second fluid chamber of said one of the fluid-sealed bushings to the second fluid chamber of said other fluid-sealed bushing, and a control valve for controlling fluid communication through said first and second passages.

6. A control device according to claim 5, wherein said link rod extends substantially longitudinally of said vehicle, the compliance of each of said fluid-sealed bushings being variable in the longitudinal direction of said bushing.

7. A control device according to claim 1, wherein said control means comprises:

a first sensor for detecting the acceleration of vertical vibrations of the vehicle body and generating a signal commensurate with the detected acceleration;

a bandpass filter connected to said first sensor for transmitting a signal having a frequency of the sprung mass of the vehicle;

a second sensor for detecting the steering angle of the steering wheel and generating a signal commensurate with the detected steering angle;

a third sensor for detecting when the vehicle is braked and generating a signal when the vehicle is braking;

a speed sensor for issuing a detected signal when the speed of travel of the vehicle exceeds a prescribed level; and circuit means for processing the signals from said bandpass filter, said second sensor, said third sensor, and said speed sensor to control said actuator based on the processed signals. when the vehicle is braked;

8. A control device according to claim 7, wherein said circuit means comprises:

a first comparator for issuing a detected signal in response to the output signal from said bandpass filter which is in excess of a prescribed level;

a second comparator for issuing a detected signal in response to the output signal from said second sensor which is in excess of a prescribed level; and a processing circuit connected to said first comparator, said second comparator, said third sensor, and said speed sensor for operating said actuator to decrease the compliances of said fluid-sealed bushings when at least one of the output signals from said first comparator, said second comparator, said third sensor, and said speed sensor is applied to the processing circuit.

9. A control device according to claim 8, wherein each of said fluid-sealed bushings comprises:

an outer tube connected to said link rod;

an inner tube through which a connecting pin extends; and a rubber member joining said outer and inner tubes to each other and at least partly defining a plurality of fluid chambers the volumes of which are variable due to relative displacement of said outer and inner tubes.

10. A control device according to claim 9, wherein said fluid chambers include first and second fluid chambers disposed respectively on the opposite sides of said inner tube; and said valve means comprising a first passage connecting the first fluid chamber of one of said fluid-sealed bushings to the first fluid chamber of the other fluid-sealed bushing, a second passage connecting the second fluid chamber of said one of the fluid-sealed bushings to the second fluid chamber of said other fluid-sealed bushing, and a control valve for controlling fluid communication through said first and second passages.

11. A control device according to claim 10, wherein said link rod extends substantially longitudinally of said vehicle, the compliance of each of said fluid-sealed bushings being variable in the longitudinal direction of said bushing.

12. A control device according to claim 1, wherein said control means comprises:

a first sensor for detecting the acceleration of vertical vibrations of the vehicle body and generating a signal commensurate with the detected acceleration;

a bandpass filter connected to said first sensor for transmitting a signal having a frequency range in the vicinity of the natural frequency of the sprung mass of the vehicle;

a second sensor for detecting the steering angle of the steering wheel and generating a signal commensurate with the detected steering angle;

a thid sensor for detecting when the vehicle is braked and generating a signal when the vehicle is braking;

a first speed sensor for issuing a detected signal when the speed of travel of the vehicle exceeds a first prescribed level;

a second speed sensor for issuing a detected signal when the speed of travel of the vehicle exceeds a second prescribed level greater than said first prescribed level; and circuit means for processing the signals from said bandpass filter, said second sensor, said third sensor, said first speed sensor, and said second speed sensor to control said actuator based on the processed signals.

13. A control device according to claim 12, wherein said circuit means comprises:

a first comparator for issuing a detected signal in response to the output signal from said bandpass filter which is in excess of a prescribed level;

a second comparator for issuing a detected signal in response to the output signal from said second sensor which is in excess of a prescribed level; and a processing circuit connected to said first comparator, said second comparator, said third sensor, said first speed sensor, and said second speed sensor for operating said actuator to decrease the compliances of said fluid-sealed bushings when the speed of travel of the vehicle is higher than said first prescribed level and lower than said second prescribed level and when at least one of the output signals from said first comparator, said second comparator, and said third sensor is applied to the processing circuit.

14. A control device according to claim 13, wherein each of said fluid-sealed bushings comprises:

an outer tube connected to said link rod;

an inner tube through which a connecting pin extends; and a rubber member joining said outer and inner tubes to each other and at least partly defining a plurality of fluid chambers, the volumes of which are variable due to relative displacement of said outer and inner tubes.

15. A control device according to claim 14, wherein said fluid chambers include first and second fluid chambers disposed respectively on the opposite sides of said inner tube; and said valve means comprising a first passage connecting the first fluid chamber of one of said fluid-sealed bushings to the first fluid chamber of the other fluid-sealed bushing, a second passage connecting the second fluid chamber of said one of the fluid-sealed bushings to the second fluid chamber of said other fluid-sealed bushing, and a control valve for controlling fluid communication through said first and second passages.

16. A control device according to claim 15, wherein said link rod extends substantially longitudinally of said vehicle, the compliance of each of said fluid-sealed bushings being variable in the longitudinal direction of said bushing.

* * * * *